United States Patent
Hoof

[11] Patent Number: 6,145,726
[45] Date of Patent: Nov. 14, 2000

[54] DEVICE FOR FITTING COMPONENTS

[75] Inventor: Gerhard-Helmut Hoof, Bad Laasphe, Germany

[73] Assignee: EJOT Verbindungstechnik GmbH & Co. KG, Germany

[21] Appl. No.: 09/272,294

[22] Filed: Mar. 19, 1999

[30] Foreign Application Priority Data

Mar. 19, 1998 [DE] Germany .................. 198 12 085

[51] Int. Cl.[7] ........................... B25C 3/00
[52] U.S. Cl. .................. 227/107; 227/113; 227/114; 227/116
[58] Field of Search .................. 227/107, 112, 227/114, 116, 117, 51, 48, 113; 72/391.6; 29/809, 810, 812.5, 243.521; 81/435, 434

[56] References Cited

U.S. PATENT DOCUMENTS

| | | | |
|---|---|---|---|
| 2,344,127 | 3/1944 | Cherry | 29/243.521 |
| 2,495,070 | 1/1950 | Mellodge | 72/391.6 |
| 2,507,047 | 5/1950 | Perry | 227/118 |
| 3,802,617 | 4/1974 | Berecz | 227/118 |
| 4,312,472 | 1/1982 | Okuda | 227/117 |
| 4,339,065 | 7/1982 | Haytayan | 227/48 |
| 4,495,841 | 1/1985 | Mori et al. | 227/117 |
| 4,628,722 | 12/1986 | Mauer et al. | 227/112 |
| 4,662,206 | 5/1987 | Mauer et al. | 227/107 |
| 4,765,175 | 8/1988 | Denham et al. | 29/812.5 |
| 5,144,870 | 9/1992 | Nick | 81/434 |
| 5,239,900 | 8/1993 | Macris | 227/48 |
| 5,640,758 | 6/1997 | Roessler et al. | 227/107 |

*Primary Examiner*—Peter Vo
*Assistant Examiner*—Jim Calve
*Attorney, Agent, or Firm*—Banner & Witcoff, Ltd.

[57] ABSTRACT

Device for conveying and fitting components which are to be inserted in a workpiece and are guided in a rail, which serves as a magazine and, at one end, has an opening (33) for delivering a component (17). The opening merges into a receiving part for a single component, which receiving part is connected to the rail via a hinge and is aligned with this rail, and the rail, together with the receiving part, is mounted in a longitudinally displaceable manner in a guide in which the receiving part, in order to receive a component, is, in the pushed-back position of the rail, held in a receiving position in which it is aligned with the rail. The receiving part is arranged in such a way that, when the rail is pushed forward, the receiving part, together with the component, projects out of the guide and, via the hinge, pivots through approximately 90° into an eject position, in which the component, in order to be fitted, can be ejected from the receiving part by a ram arranged next to the guide and can be fitted in a workpiece.

8 Claims, 3 Drawing Sheets

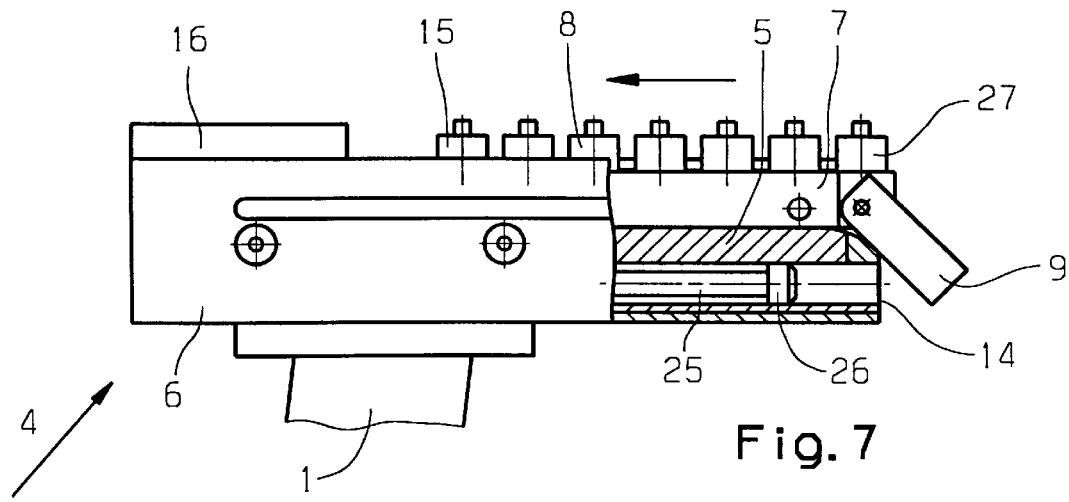
Fig. 7
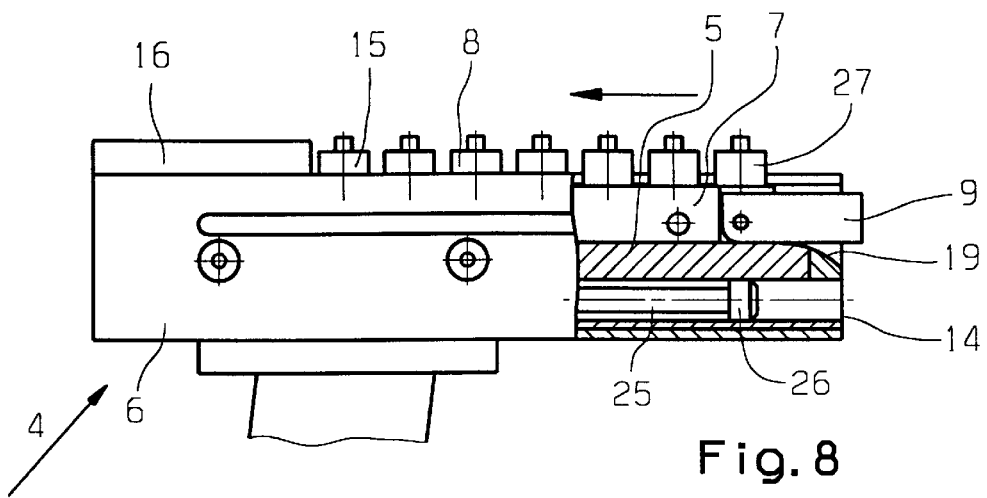
Fig. 8
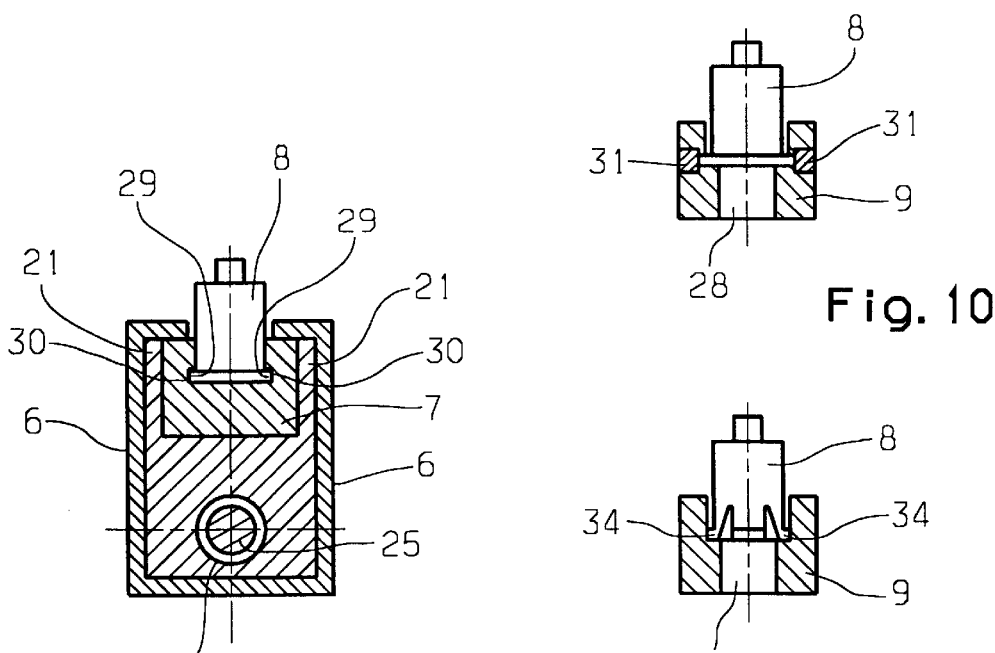
Fig. 9
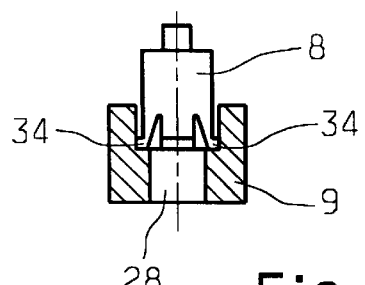
Fig. 10
Fig. 11

DEVICE FOR FITTING COMPONENTS

FIELD OF THE INVENTION

The invention relates to a device for conveying and fitting components which are to be inserted in a workpiece and are guided in a rail, which serves as a magazine and, at one end, has an opening for delivering a component.

BACKGROUND OF THE INVENTION

A device of this nature is known from U.S. Pat. No. 2,344,127. This device is used to handle blind rivets which are suspended one behind the other in a rail and in the rail are forced towards the end of the rail by spring stress. At the end of the rail, there is a mechanism which closes off the opening of the rail which is present in that area and allows only a single blind rivet to be delivered each time. This delivery is carried out by means of a lever which is arranged on a setting tool and is mounted on the setting tool in such a manner that it can pivot about an axis. To deliver a blind rivet which is suspended in front of the opening in the rail, the lever is pivoted towards this opening, during which movement the lever is able to pick up a single blind rivet and pivot it into a position in which the blind rivet is inserted in the setting tool. The rail is arranged on the side of the setting tool and thus forms a single unit with the setting tool. The mechanism which is required to deliver a blind rivet while simultaneously unlocking the rail is of complicated design and is arranged on the setting tool in such a manner that it can be accessed freely from outside, so that if the tool is not handled carefully the delivery mechanism can easily become damaged. Moreover, this device is a relatively complicated structure.

SUMMARY OF THE INVENTION

The invention is based on the object of providing a device for conveying and fitting components which are to be inserted in a workpiece, of the type mentioned at the outset, which device is robust and of compact design with few parts. According to the invention, this is achieved by the fact that the opening merges into a receiving part for a single component, which receiving part is connected to the rail via a hinge and is aligned with this rail, and the rail, together with the receiving part, is mounted in a longitudinally displaceable manner in a guide in which the receiving part, in order to receive a component, is, in the pushed-back position of the rail, held in a receiving position in which it is aligned with the rail, the receiving part being arranged in such a way that, when the rail is pushed forward, the receiving part, together with the component, projects out of the guide and, via the hinge, pivots through approximately 90° into an eject position, in which the component, in order to be fitted, can be ejected from the receiving part by a ram arranged next to the guide and can be fitted in a workpiece.

In the pushed-back position of the rail, the receiving part, which is held in a receiving position aligned with the rail, acts as a component of the rail, and from this position the receiving part merely has to be pivoted away when the rail is pushed forward in order to move, together with a component, into the eject position. The ability of the receiving part to move with respect to the rail is ensured by the hinge, via which the receiving part is connected to the rail, and therefore components of simple structure are involved. The structure of the device in this case forms a closed arrangement, from which, in the eject position, only the relatively short receiving part is pivoted away, with the result that the device as a whole is protected from damage.

In order to feed a component to the receiving part, it is expedient to provide a stop on the rail, which stop, after a component has been fitted, stops the components in the rail when the latter is pushed back and presses these components towards the opening in the rail, the receiving part being pivoted back out of the eject position into its receiving position, which is aligned with the rail, by a deflector part which is arranged at the opening, so that the action of the stop causes the front component which is being guided in the rail to slide into the receiving part, the deflector part guiding the pivoting of the receiving part into the eject position when the rail is pushed forward. The deflector part, which may, for example, be formed by a rounded section arranged at the end of the rail, is a component of simple design which merely has to control the movement of the receiving part out of the receiving position into the eject position and back when the rail is pushed forward and pushed back.

In order to provide protection in particular against the components falling out of the rail when handling the device, the components are expediently guided in lateral longitudinal grooves in the rail, into which grooves projections of the components fit.

In order to protect against the component which has been guided into the eject position of the receiving part falling out when handling the device, it is expedient if clamping means for holding the component in the eject position are provided on the receiving part. However, it is also possible for this holding function to be given by the component itself, by providing appropriate clamping means on the component.

It is expedient to arrange a locking device, which releasably secures the receiving part in the eject position, on the guide. If the device, with the receiving part in the eject position, is then moved in any way with respect to a workpiece, in particular is guided into and held in a vertical position, the locking device secures the receiving part in its eject position, so that it cannot pivot under the influence of the force of gravity. The locking device used may be a magnet which uses its relatively low force to hold the receiving part in the eject position but readily releases the receiving part when the rail is pulled back, so that the receiving part can be pivoted back and transferred into its receiving position.

Furthermore, it is expedient to provide a magnet, which pulls the receiving part towards the deflector part, in the region of the receiving part and of the deflector part. Such a magnet makes the movement of the receiving part independent of gravity, since, by means of the magnet, the receiving part, when it pivots away from the rail, is pulled into the pivoted-away eject position by the force of the magnet, an operation which, under certain circumstances, has to be carried out against the force of gravity, when the device is being used in a corresponding way. This configuration therefore makes the device independent of the force of gravity and means that it can therefore be moved towards a workpiece which is to be fitted in any desired position.

BRIEF DESCRIPTION OF THE DRAWING

An exemplary embodiment of the invention is illustrated in the figures, in which:

FIG. 7 shows the rail in the position in which it has been pulled part way back, with an empty receiving part, FIG. 8 shows the device with a number of components which has been reduced by one, FIG. 9 shows a section through the rail on line IX—IX in accordance with FIG. 3, FIG. 10 shows a section through the receiving part, with a component inside it, on line X—X in accordance with FIG. 3, FIG. 11 shows an illustration corresponding to FIG. 10, with a component provided with clamping means.

DETAILED DESCRIPTION OF THE PREFERRED EMBODIMENTS

Figure 1:
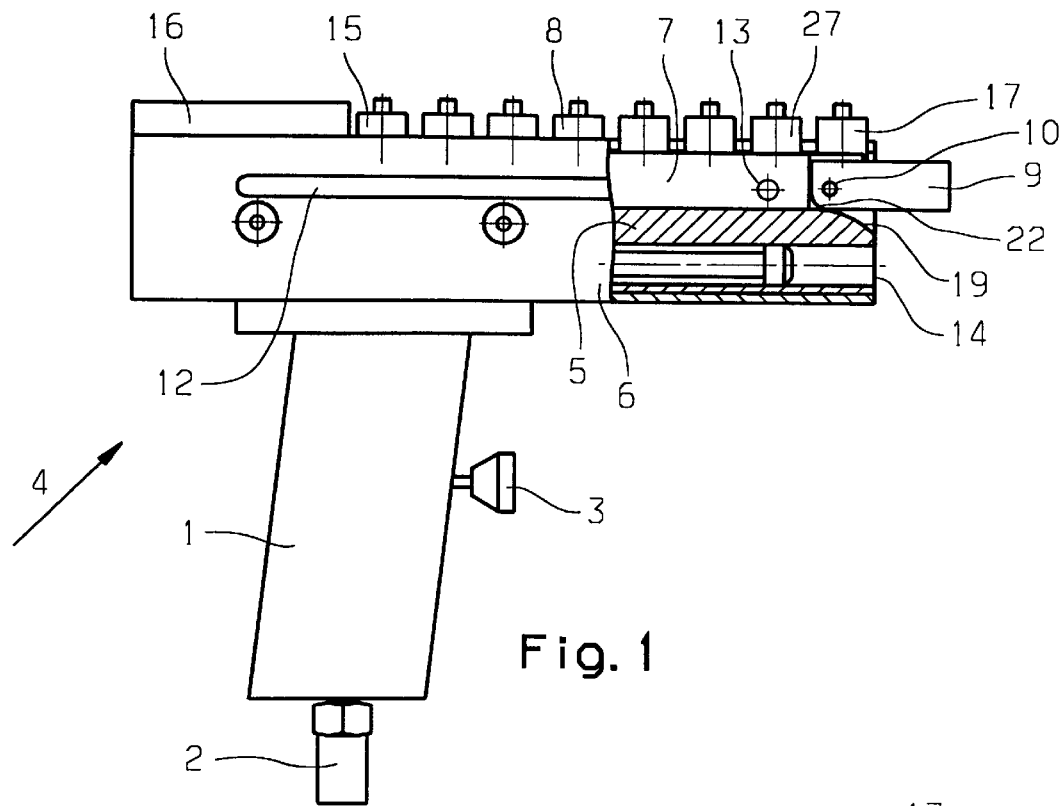
FIG. 1 shows a side view of the fully loaded device.
Figure 2:
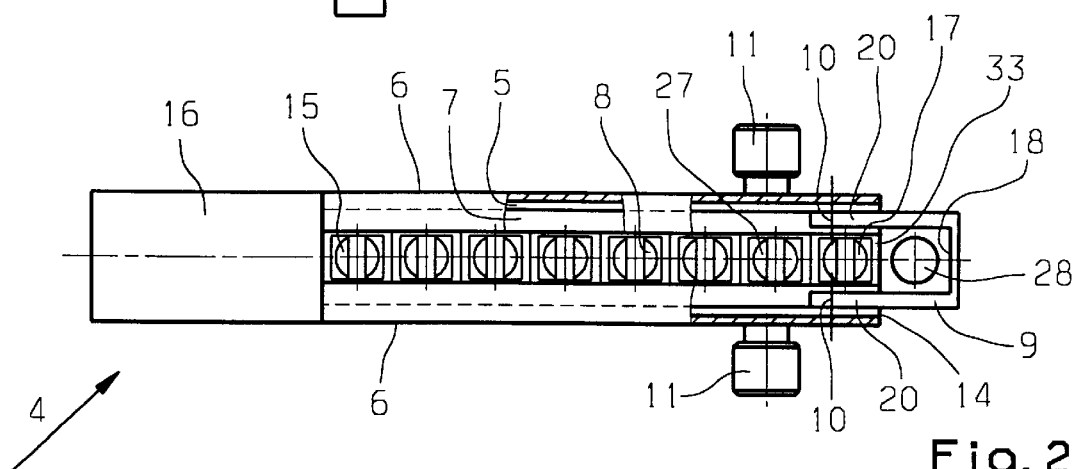
FIG. 2 shows a plan view of the same device.

FIGS. 1 and 2 show the device for conveying and fitting components 8, which device, for the sake of ease of handling, is provided with the handle 1, into which a supply duct 2 opens out, which is used to supply, for example, electrical or pneumatic energy. The button 3, which is actuated in a conventional manner in order to commence operation of the components accommodated in the housing 4, is arranged on the handle 1.

The guide 5, which is enclosed at the sides by the side walls 6, is accommodated in the housing 4. The rail 7, which is supported in a longitudinally displaceable manner by the guide 5 (cf. also FIG. 9), is mounted in the guide 5. The rail 7, which serves as a magazine, in this case supports eight components 8, which are plastic inserts which are to be inserted into a workpiece (cf. in this connection FIGS. 5 and 6). Of course, other types of components may also be used. The receiving part 9 is rotatably attached to the right-hand end of the rail 7, specifically by way of the hinge 10, only the pin of which is shown in FIG. 1. In FIGS. 1 and 2, the receiving part 9 is shown in the position in which it is aligned with the rail 7, namely the receiving position of the receiving part 9. In this receiving position, the receiving part 9 is ready to receive a component 8.

The rail 7, which is supported in a longitudinally displaceable manner by the guide 5, can be displaced by means of the grips 11 (cf. FIG. 2), which engage through slots 12 in the side walls 6 and are attached to the rail 7 at the attachment position 13.

Figure 3:
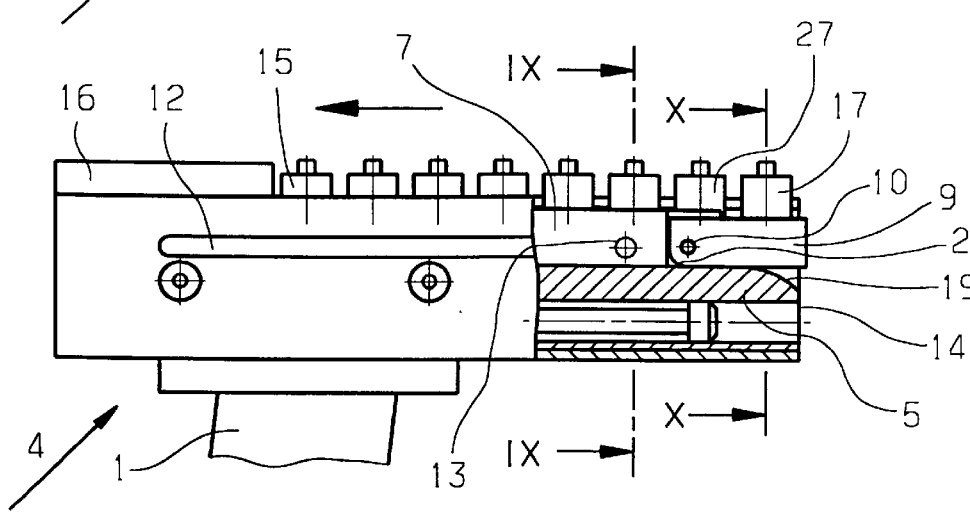
FIG. 3 shows the device in the receiving position.

In order to load the receiving part 9 with a component 8, the grips 11 are pushed to the left with respect to the end 14 of the side walls 6 and the guide 5 (cf. arrow in FIG. 3), and the components 8 supported by the rail 7 are carried along with it until the first or most rearward of the components, which throughout the specification is designated 15, comes into contact with the stop 16, which is arranged on the housing 4 in such a manner that it spans the side walls 6. The stop 16 blocks the movement of the component 15 and therefore also of the components 8 arranged to the right of the component 15, so that the rail 7 slides beneath them to the left, the front component, which throughout the specification is designated 17 being pushed through the opening 33 (cf. FIG. 2) in the rail 7, into the receiving part 9, due to the aligned position of the receiving part 9 and the rail 7. In the process, the last-but-one component 27 moves into the position of the component 17 shown in FIG. 1, and component 17, as shown in FIG. 3, is ultimately pushed as far as the end wall 18 (cf. FIG. 2). The receiving part 9 is thus loaded with a component, specifically with the component 17. This position is illustrated in FIG. 3.

During the operations described above, the receiving part 9 is continuously held in its position in which it is aligned with the rail 7, specifically by both rail 7 and receiving part 9 being supported with respect to the guide 5. After the components 8 have been pushed towards end wall 18 of the receiving part in the manner described above, with the component 17 ultimately reaching the position illustrated in FIG. 3, the device is then ready to be transferred into its eject position. This is now described with reference to FIGS. 4 and 5.

After the device has adopted the position illustrated in FIG. 3, the rail 7 is moved away from the stop 16 by suitable displacement of the grips 11 (cf. arrow in FIG. 4), during which movement the receiving part 9, which initially protrudes beyond the end 14 of the side walls 6 (cf. FIGS. 1 and 2), is pushed further past the said end 14, so that the receiving part 9 can now be transferred into a pivoted position with respect to the rail 7. To allow this pivoting, that end area of the guide 5 which faces the end 14 is provided with a rounded section 19 which acts as a deflector part and allows the receiving part 9 to be pivoted uniformly with respect to the rail 7 when the receiving part is advanced, until the rail 7 has ultimately reached the position illustrated in FIG. 5, in which the receiving part 9 has moved into the eject position. In this position, the receiving part 9 has pivoted through 90° with respect to the rail 7.

As can be seen from FIG. 2, the hinge 10 includes, for the purpose of pivoting the receiving part 9, the two tines 20 of the receiving part 9, which engage between the side walls 6 and the corresponding part of the guide 7, thus providing the receiving part 9 with the required rotary mobility. To make this rotary mobility efficient, the tines 20 are provided, on their side facing the rail 7, with the curvature 22.

When the device has the receiving part 9 in the eject position (FIG. 5), the component 17 which is supported by the receiving part 9 is positioned opposite a workpiece 23 which is provided with an appropriate hole 24 in which the component 17 is to be inserted. By guiding the device by hand from the position illustrated in FIG. 5 to the position illustrated in FIG. 6, the receiving part 9 ultimately comes to bear against the workpiece 23, so that the component 17 can now be ejected into the hole 24. This is carried out by means of the ram 25, which at its right-hand end has the head piece 26 which, when the ram 25 moves, ejects the component 17 from the receiving part 9 and presses it into the hole 24 in the workpiece 23. Parallel to the guide 5, the device contains a known mechanism, no further details of which are required in this connection, for actuating the ram 25. This mechanism is at any rate accommodated in the device inside the side walls 6, so that the compactness of the device is maintained.

After the component has been set in accordance with FIG. 6, the device is guided away from the workpiece 23 and the rail 7 is pulled back with respect to the guide 5, by means of the grips 11, as described in connection with FIG. 2. When the rail 7 is pulled back in this way (arrow in FIG. 7 and FIG. 8), the receiving part 9 is pivoted back by means of the rounded section 19 (cf. partially pivoted-back position in accordance with FIG. 7). As the rail 7 is pulled back further, the receiving part 9 ultimately returns to its position in which it is aligned with the rail 7 (FIG. 8), the component 15 ultimately coming into contact with the stop 16, with the result that the components supported by the rail 7 are displaced to the right, until ultimately the position in accordance with FIG. 3 is reached again, in which position the component which is situated furthest to the right (component 27) is pushed into the receiving part 9, whereupon a new setting operation, as described with reference to FIGS. 5 and 6, can be carried out.

The sectional illustration in accordance with FIG. 9 (section on line IX—IX from FIG. 3) shows the combination of the side walls 6 with the guide 5 and the rail 7, FIG. 9 also showing the ram 25. When it is actuated, the ram 25 passes through the hole 28, which is shown in FIGS. 2 and 10, in the receiving part 9. It can also be seen from FIG. 9 that the components 8 are guided, by means of their projections 29, in corresponding longitudinal grooves 30 in the rail 7 and are thus prevented from falling out of the rail 7.

The sectional illustration in accordance with FIG. 10 (section on line X—X from FIG. 3), in which the rail 7 and the guide 5 are omitted, shows how the components 8 are held in the receiving part 9, in this case by means of clamping means 31 in the receiving part 9.

FIG. 11 shows a different way of holding the components 8. by means of clamping means 34 on the component 8.

Figure 4:
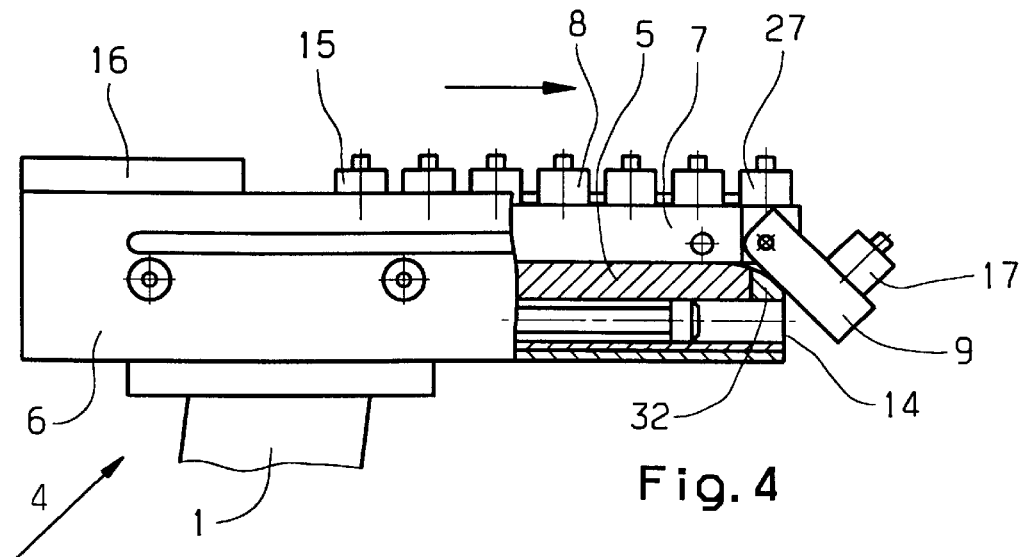
FIG. 4 shows the device with the rail pushed part way forward.
Figure 5:
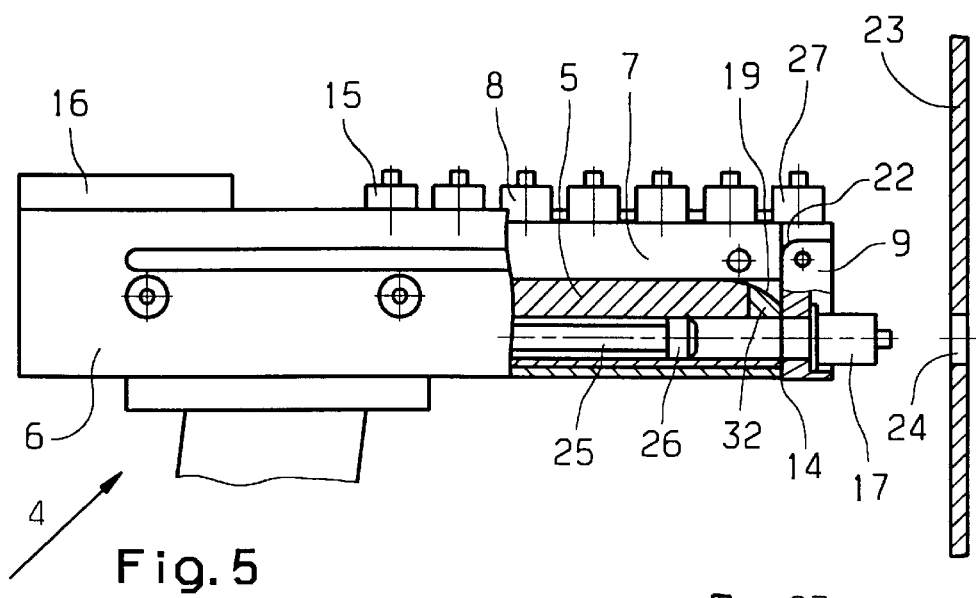
FIG. 5 shows the device with the receiving part in the eject position.
Figure 6:
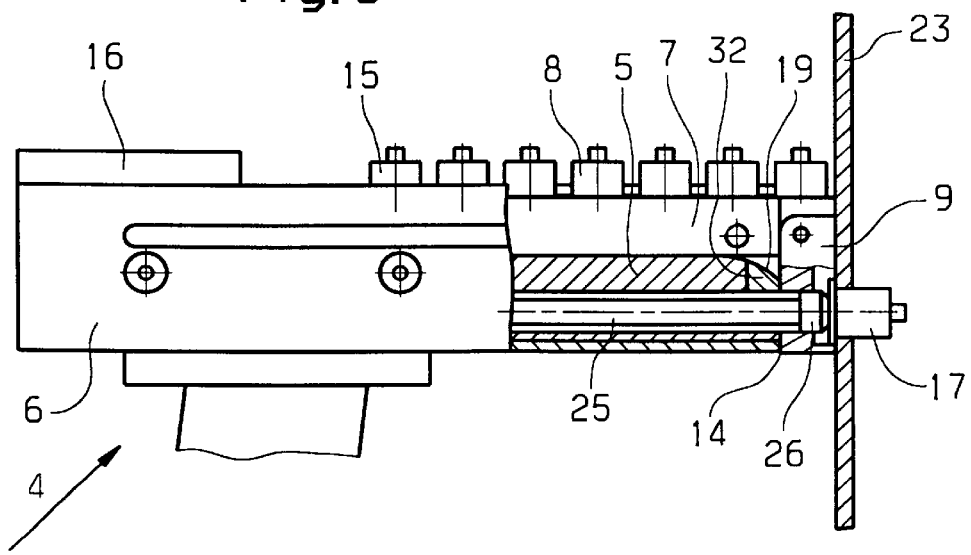
FIG. 6 shows the device in accordance with FIG. 5 when a component has been ejected and inserted in a workpiece.

According to the exemplary embodiment illustrated in FIGS. 4, 5 and 6, that area of the guide 5 which is provided with the rounded section 19 is designed as a magnet 32. This magnet 32 acts as a locking device which releasably secures the receiving part 9 in the eject position illustrated in FIG. 5. After the device has assumed this position, it can be moved to and fro in all possible positions, during which time, of course, the force of gravity acts on the receiving part 9, without the latter being able to shift from its eject position. Furthermore, the magnet 32 ensures that when the rail 7 is displaced (in the direction of the arrow shown in FIG. 4), i.e. during the movement shown in FIGS. 4 and 5, the receiving part 9 is always pulled towards the rounded section 19, i.e. cannot be pulled away from the rail 7 in the event of its position being adversely affected by the force of gravity. The receiving part 9 follows the rounded section 19 irrespective of whether the device is being moved at the same time, the receiving part 9 always bearing against the rounded section 19, until ultimately the eject position of the receiving part 9, illustrated in FIG. 5, is reached. Naturally, it is also possible to use any other form of energy-storing means, e.g. a spring, instead of the magnet.

What is claimed is:

1. Device for conveying and fitting components (8) which are to be inserted in a workpiece (23) and are supported and guided by a rail (7) with a longitudinal axis, which serves as a magazine and, at one end, has an opening (33) for discharging the components from the rail, wherein the opening (33) merges into a receiving part (9) when in a receiving position for receiving a single one of the components (17) discharged from the rail, which receiving part has a longitudinal axis, is connected to the rail (7) via a hinge (10) and is aligned with this rail in the receiving position, and the rail (7), together with the receiving part (9), is mounted in a longitudinally displaceable manner on a guide (5) in which the receiving part (9) receives the discharged component (17) in a pushed-back position of the rail (7) and is held by the guide in the receiving position axially aligned with the rail (7), the receiving part (9) being arranged in such a way that, when the rail (7) is pushed forward, the receiving part (9), together with the received component (17), projects out beyond an end of the guide(5) and, via the hinge (10), pivots through approximately 90° into an eject position, in which the component (17), in order to be fitted, can be ejected from the receiving part (9) by a ram (25) arranged next to the guide (5) and can be fitted in a workpiece (23).

2. Device according to claim 1, wherein, the components (8) in the rail (7) are stopped by a stop (16) when the rail is pushed back, which stop presses the components (8) towards the opening (33) in the rail (7), the receiving part (9) being pivoted back out of the eject position into its receiving position, which is aligned with the rail (7), by a deflector part (19) which is arranged at the opening (33) and guides the pivoting of the receiving part (9) into the eject position when the rail (7) is pushed forward.

3. Device according to claim 1 or 2, wherein the components (8) are guided in lateral longitudinal grooves (30) in the rail (7), into which grooves projections (29) of the component (8) fit.

4. Device according to claim 3, wherein clamping means (31) for holding the component (8) in the eject position are provided on the receiving part (9).

5. Device according to claim 3, wherein clamping means (34) for holding the components (8) in the eject position are provided on the component (8).

6. Device according to claim 1 or 2, wherein a locking device (32), which releasably secures the receiving part (9) in the eject position, is arranged on the guide (5).

7. Device according to claim 6, wherein the locking device contains a magnet (32).

8. Device according to one of claim 2, wherein a magnet (32), which pulls the receiving part (9) towards the deflector part (19), is provided in the region of the receiving part (9) and of the deflector part (19).

* * * * *